United States Patent [19]

Sivaslian

[11] Patent Number: 4,531,457
[45] Date of Patent: Jul. 30, 1985

[54] TWO PIECE JUICER

[76] Inventor: Lillian Sivaslian, 81 Windtree, Torrington, Conn. 06790

[21] Appl. No.: 616,401

[22] Filed: Jun. 1, 1984

[51] Int. Cl.³ .......................... A23N 1/00; A47J 43/00
[52] U.S. Cl. ........................................ 99/507; D7/48; 99/508; 100/234
[58] Field of Search .......................... 99/495, 506–508; 100/234, 125; D7/47, 48; 220/343

[56] References Cited

U.S. PATENT DOCUMENTS

| 587,860 | 8/1897 | Redmon | 100/234 |
| 1,117,122 | 11/1914 | Williams | 100/234 |
| 1,959,615 | 5/1934 | Derrah | 100/234 |
| 3,007,595 | 11/1961 | Remley | 220/343 X |

Primary Examiner—Timothy F. Simone
Attorney, Agent, or Firm—E. Seward Stevens

[57] ABSTRACT

The invention relates to a two piece juicer which can be assembled by hand. This comprises one section which holds a horizontal pin which, when properly aligned with the other section which carries an extension to accept the pin, results in a pivot enabling closing and opening the respective parts.

4 Claims, 6 Drawing Figures

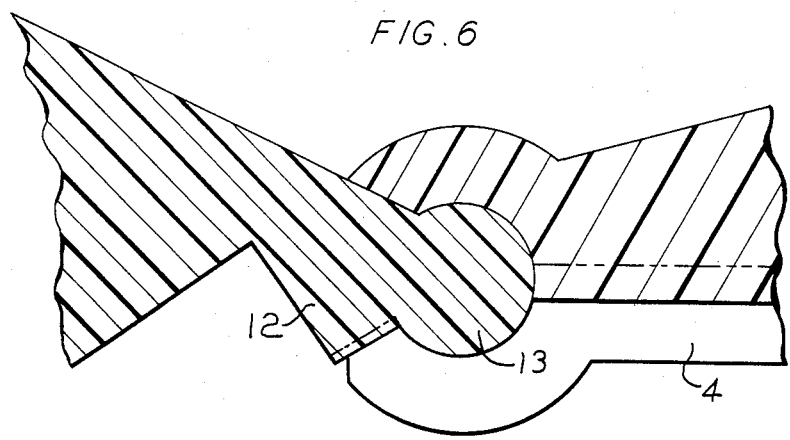

TWO PIECE JUICER

PRIOR ART

The prior art considered by applicant does not show the current invention either in a single patent or in any practical combination of elements from any of the patents.

Batke U.S. Pat. No. 2,735,360, 2/21/56, has hinged members 8 and 10 but there is no description of a "hinge pin".

Plaxco U.S. Pat. No. 2,446,432, 8/3/48, requires separate pins 5 inserted from inside or outside.

Schwab U.S. Pat. No. 2,699,109, 1/11/55, requires a separate rivet 11 in elements 12 and 12'.

Remley U.S. Pat. No. 3,007,595, 11/7/61, requires separate hinge pins 37.

Sunko U.S. Pat. No. 2,766,901, 10/16/56, has separate hinge pins 21.

Nicpon U.S. Pat. No. 3,991,905, 11/16/76, has a separate pin 41.

Sarossy U.S. Pat. No. 2,776,616, 1/8/57, has a bolt or pin 14 anchored to sidewalls 22.

Zysset U.S. Pat. No. 3,580,168, 5/25/71, has a pin 3 fixed in the sidewalls of lever 1.

Squarcio U.S. Pat. No. 2,711,688, 6/28/55, requires a pin 7 and its spring 8.

Primas U.S. Pat. No. 2,200,399, 5/14/40, has a pin receiving groove 17 in flanges 15 and the ends 21a enter grooves 17.

DiAddario U.S. Pat. No. 3,295,714, 1/3/67, requires pintle pins 30-32.

In none of the above patents is a structure shown embodying one section with a pin receiving section attached to receive a pin formed integral with the end of a second section. Neither the structure nor its assembly is shown in the prior art.

DRAWINGS

A practical embodiment of my invention is shown in the accompanying drawings in which FIG. 1 represents in side elevation the combination assembled in operative condition.

FIG. 6 represents a section taken on the line VI—VI of FIG. 5 looking in the direction of the arrows.

SPECIFICATION

Figure 1:
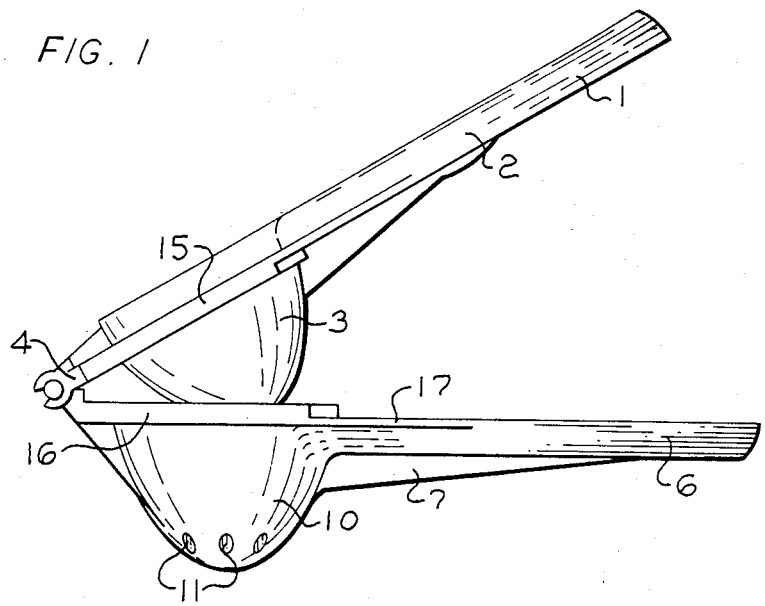
Figure 2:
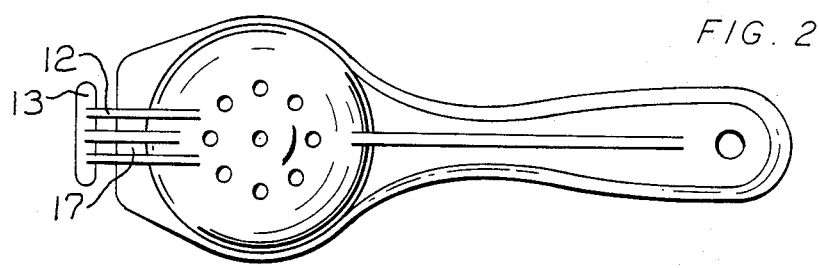
FIG. 2 represents a bottom plan view of the embodiment shown in FIG. 1 being the lower section of same.
Figure 3:
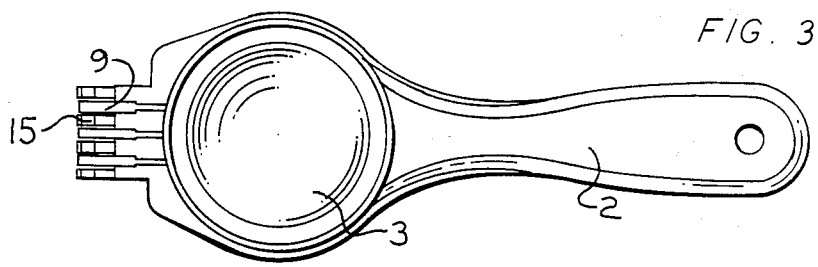
FIG. 3 represents a top plan view of the embodiment shown in FIG. 1, being the upper section of same.

Referring to the accompanying drawings in which the respective parts bear the same numbers in each view, one piece which is the lower piece illustrated in FIG. 1 comprises a handle 6 carrying a cup shaped element 10, same being perforated at its rounded lower section, the perforations being denoted, collectively, by 11. One end of the cup portion 10 fixed at the opposite end of the handle 6 comprises a notched portion 17 and fingers 12 protruding longitudinally from the end of the fixed portion 10 and separated by said notched portion plus a horizontal element or pin 13 formed integral with and supported by said protruding fingers 12. Handle 6 is reinforced by a longitudinal rib 7 on its underside.

Figure 4:
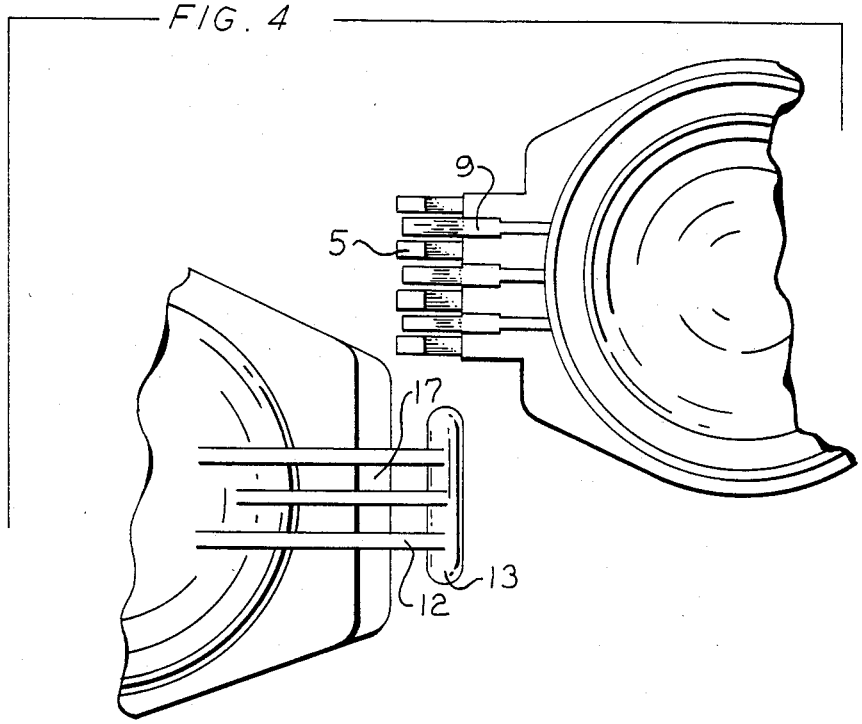
FIG. 4 represents a plan view of the upper and lower elements of FIG. 1 alined for assembly.
Figure 5:
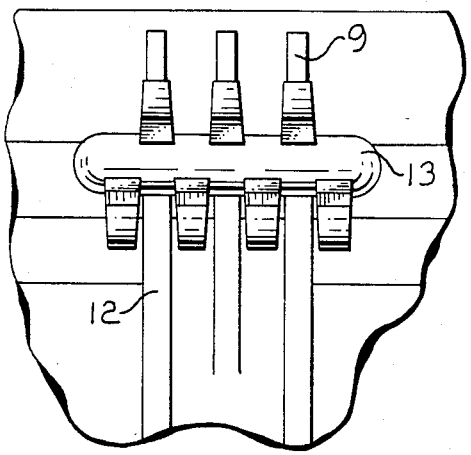
FIG. 5 represents, in detail, the operative engagement of the elements serving as a hinged connection of the upper and lower sections of the embodiment shown in FIG. 1.

The second or upper piece 1 comprises a handle portion 2 which carries at one end thereof an imperforate cup shaped portion 3. Said cup shaped portion 3 has extending therefrom from the end opposite the handle 2 a plurality of projecting portions 4 and a notched portion 5 in each at one end arranged to receive the horizontal element or pin 13 of the first piece 10 when same is inserted horizontally therein from the position shown in FIG. 4 to that shown in FIG. 5.

The parts are moved horizontally with respect to each other with the handle angled so that the outer section of each finger permits the fingers 12 to be pushed through the notches so that when the pivot pin 13 has reached a position in the middle of the set of projecting portions 4 one handle can be swung toward the other and the fingers 12 carrying the pin 13 will be received between the projecting portions 4 extending from the cup shaped portion 3.

The union of said horizontal element or pin 13 with said notched portions 5 on said projecting portions 4 provides a hinge or pivot so that the two portions 6 and 1 may be swung toward or away from each other as shown in FIG. 1 for the purposes hereinafter noted.

The notched portion 5 in each finger 4 (numbered collectively) on the upper cup portion 3 provides an open end at the outer extremity of each finger 4 with all said notched portions 5 alined to receive the pin 13 carried by parallel protruding fingers 12. (See FIGS. 4 and 5). The fingers 4 and 12 on the respective portions 3 and 10 are so arranged that when the pin 13 is properly seated in operative position and the two parts 3 and 10 are swung toward squeezing position the fingers 4 of the upper section 3 are received between the fingers 12 of the lower section 10 so the parts may be closed to "squeezing" position.

Each section (top 3 and bottom 10) is provided with a circumferential band 15, 16 which acts as a stop to prevent "over-squeeze" and also terminates in a strengthening element at the outer side of each set of fingers.

Lower fingers 12 are slanted upward to a plane above the upper plane of the lower cup 10.

Lower cup 10 is notched at 17 to receive the longitudinal reinforcing element 3 of the upper handle 1.

In order to operate the structure in its intended manner a piece of fruit or other product to be squeezed is placed in the lower cup 10 and if same is a piece of fruit the cut face thereof is placed facing down.

Handle 2 is then swung on the pivot pin 13 which has been operably engaged with the notches 5 of the fingers 4 in order to compress the fruit by the pressure of the cup shaped portion 3 on the fruit against the interior surface of the cup shaped portion 10 and the juice will drain out of holes 11 into a receptacle which is not shown.

Since it is evident that changes may be made in the structure form an arrangement of the several parts without departing from the spirit and scope of my invention, I do not intend to be limited to the embodiments herein shown and described except as set forth in the following claims.

I claim:
1. A squeezing device comprising
an upper handle, handle end, a cup shaped portion formed integral with one handle end thereof, fingers extending from said cup shaped portion, a notched section in each said finger at its outer extremity, a lower handle, handle ends, a lower cup shaped portion formed integral with one handle end thereof, elements projecting from said lower cup shaped portion, a pivot pin formed integral with and at right angles to said elements, said pin being rotatably fitted in the notched portion of the fingers of the upper cup portion whereby either handle is movable toward or away from the other to fit one cup shaped portion into the other when swung on the pin as a pivot.

2. The structure according to claim 1 in which each cup portion is provided at its upper surface with a reinforcing element formed integral with and supporting each set of fingers.

3. The structure according to claim 1 in which fingers are fixed on each cup shaped portion and so located as to fit between each other when the handles are swung into operative position.

4. The structure according to claim 1 in which the notches in the fingers of the upper cup portion alternatively overlap and underlap the fixed pin carried by the lower cup portion.

* * * * *